(12) United States Patent
Tirloni

(10) Patent No.: US 6,751,389 B2  
(45) Date of Patent: Jun. 15, 2004

(54) OPTICAL FIBER FOR EXTENDED WAVELENGTH BAND

(75) Inventor: Bartolomeo Italo Tirloni, Bergamo (IT)

(73) Assignee: Pirelli Cavi E Sistemi S.p.A., Milan (IT)

(*) Notice: Subject to any disclaimer, the term of this patent is extended or adjusted under 35 U.S.C. 154(b) by 0 days.

(21) Appl. No.: 09/812,019

(22) Filed: Mar. 20, 2001

(65) Prior Publication Data

US 2002/0006259 A1 Jan. 17, 2002

Related U.S. Application Data

(63) Continuation of application No. PCT/EP99/06958, filed on Sep. 21, 1999.
(60) Provisional application No. 60/104,636, filed on Oct. 16, 1998.

(30) Foreign Application Priority Data

Sep. 21, 1998 (EP) .............................................. 98117828

(51) Int. Cl.$^7$ ................................................. G02B 6/22
(52) U.S. Cl. ...................................................... 385/127
(58) Field of Search ................................ 385/123, 124, 385/126, 127

(56) References Cited

U.S. PATENT DOCUMENTS

| | | | |
|---|---|---|---|
| 4,406,518 A | | 9/1983 | Matsumura et al. |
| 4,770,492 A | | 9/1988 | Levin et al. |
| 4,852,968 A | | 8/1989 | Reed |
| 5,013,131 A | * | 5/1991 | Fotheringham ............. 385/124 |
| 5,553,185 A | | 9/1996 | Antos et al. ................ 385/127 |
| 5,684,909 A | | 11/1997 | Liu |

(List continued on next page.)

FOREIGN PATENT DOCUMENTS

| | | |
|---|---|---|
| EP | 0 674 193 A2 | 9/1995 |
| WO | WO 86/04689 | 8/1986 |

OTHER PUBLICATIONS

Bell Labs, "Technical Information on the Adv antages of TrueWave® RS Fiber", Lucent Technologies, WWW. bell–labs.com, pp. 1–4, (original publication date unknown).

Jinno, M. et al., "Design of Ultra–Wide Band (1450–1560 nm ) WDM Transmission Systems Considering intra– and inter– W avelength–Band Nonlinear Interactions", T echnology and Infrastructure, pp. 205–208, (1998), (month unknown).

Kani, J. et al., "1470nm Band Wavelength Division Multiplexing Transmission", Electronics Letters, vol. 34, No. 11, pp. 1118–1119, (1998), (May).

Akasaka, Y. et al., "Enlargement of Effective Core Area on Dispersion Flattened Fiber and Its Low Nonlinearity", OFC '98 Technical Digest, Thursday Morning, pp. 302–303, (1998), (month unknown).

(List continued on next page.)

Primary Examiner—Rodney Bovernick  
Assistant Examiner—Mike Stahl  
(74) Attorney, Agent, or Firm—Finnegan, Henderson, Farabow, Garrett, & Dunner, L.L.P.

(57) ABSTRACT

An optical transmission fiber for use in a wavelength division multiplexing transmission system is disclosed. The transmission fiber includes an inner core surrounded by a first, second and at least a third glass layer along the length of the fiber. The first glass layer has a depressed refractive-index difference and the second glass layer has a refractive-index difference of substantially zero. The third glass layer has a positive refractive-index difference. The fiber has an improved relationship between dispersion slope and depressed profile volume. The fiber can have a dispersion value of at least 1.5 ps/nm/km and a dispersion slope of less than about 0.07 ps/nm$^2$/km over an extended range of carrier wavelengths for the transmission system, such as the range 1450–1650 nm.

33 Claims, 11 Drawing Sheets

U.S. PATENT DOCUMENTS

| | | | |
|---|---|---|---|
| 5,781,684 A | | 7/1998 | Liu |
| 5,905,838 A | * | 5/1999 | Judy et al. .................. 385/123 |
| 5,999,679 A | * | 12/1999 | Antos et al. ................. 385/127 |
| 6,266,467 B1 | * | 7/2001 | Kato et al. .................. 385/123 |
| 6,301,419 B1 | * | 10/2001 | Tsukitani et al. ........... 385/123 |
| 6,430,347 B1 | * | 8/2002 | Cain et al. .................. 385/123 |
| 6,535,675 B1 | * | 3/2003 | Rousseau et al. ........... 385/123 |

OTHER PUBLICATIONS

Nouchi, P., "Maximum Effective Area for Non–Zero Dispersion–Shif ted Fiber", OFC '98 Technical Digest, Thursday Morning, pp. 303–304, (1998), (month unknown).

Hatayama, H. et al., "Dispersion Flattened Fiber with Large Effective–Core Area More Than 50 $\mu m^2$", OFC '98 Technical Digest, Thursday Morning, pp. 304–305, (1998), (month unknown).

Tajima, K., "Low–Loss Optical Fibers Realiz ed by Reduction of Rayleigh Scattering Loss", OFC '98 Technical Digest, Thursday Morning, pp. 305, (1998), (month unknown).

Srivastava, A.K., et al., "1Tb/s Transmission of 100 WDM 10 Gb/s Channels Over 400 km of TrueWave™ Fiber", Lucent Technologies, OFC '98 Technical Digest, pp. PD10–1–PD10–4 (1998), (month unknown).

Jinno, M., et al., "First Demonstration of 1580nm Wavelength Band WDM Transmission for Doubling Usable Bandwith and Suppressing FW M in DSF", Electronics Letters, vol. 33, No. 10, pp. 882–883, (1997) (May).

Grasso, G. et al., "Microbending Effects in Single Mode Optical Cables", International W ire & Cable Symposium Proceedings, pp. 722–731, (1988), (month unknown).

Grasso, G. et al., "Microbending Losses of Cabled Single M ode Fibres", pp. 526–532, (pub. date unknown).

* cited by examiner

OPTICAL FIBER FOR EXTENDED WAVELENGTH BAND

This application is a continuation of International Application No. PCT/EP99/06958, filed Sep. 21, 1999, and claims the priority of EP98117828.8, filed Sep. 21, 1998, and the benefit of U.S. Provisional application No. 60/104,836, filed Oct. 16, 1998.

BACKGROUND OF THE INVENTION

The present invention relates generally to an optical transmission fiber that has improved dispersion characteristics across the low attenuation band of optical fibers, and specifically to an optical transmission fiber for use in a wavelength-division-multiplexing transmission system that has low attenuation and tailored dispersion characteristics across the bandwidth of 1450–1650 nm.

In optical communication systems, non-linear optical effects are known to degrade the quality of transmission along standard transmission optical fiber in certain circumstances. These non-linear effects, which include four-wave mixing, self-phase modulation, Brillouin scattering, Raman scattering, and cross-phase modulation, induce distortion into the transmitted signal in high-power systems, thereby degrading the quality of the transmission. In particular, the non-linear effects can hamper quality transmission using wavelength division multiplexing (WDM), which otherwise greatly enhances the signal carrying capability of optical transmission fibers by increasing the number of transmission channels through which signals may be sent.

These non-linear effects can be minimized or avoided by using single-mode transmission fibers that have a large effective area. In addition, the phenomenon of four-wave mixing can be minimized by fibers having an absolute value of dispersion that is greater than zero at or around the operating wavelengths. However, in advanced WDM systems, such as Dense Wavelength Division Multiplexing (DWDM) and Hyper-Dense Wavelength Division Multiplexing (HDWDM) systems, where the transmission channels are closely packed together (spacing $\leq 0.4$ nm), the value of dispersion must meet a minimum value to maintain the quality of the signals. On the other hand, if the dispersion value of the fiber becomes too large, the signals will become distorted during transmission unless dispersion correction devices are included in the transmission line. Thus, for an optical fiber to be effective in a WDM system, the fiber must have a minimum dispersion, but the value of dispersion must also be below a maximum value.

Optical fibers in general exhibit low attenuation across a wavelength range of about 1450–1650 nm. Indeed, the minimum spectral attenuation for standard optical fibers occurs at around 1580 nm, while intrinsic fiber attenuation remains typically below 0.27 dB/km for dispersion-shifted fibers up to around 1650 nm and even lower for dispersion unshifted fibers. However, conventional optical-fiber amplifiers doped with rare-earth materials such as erbium operate most effectively in a more limited wavelength window between around 1530–1565 nm. As a result, some research has focused on minimizing non-linear effects and attenuation for WDM systems across the wavelength range of 1530–1565 nm.

Due to recent technological advances in optical amplifiers, the transmission window of operating wavelengths for WDM systems is increasing from the traditional wavelength range of 1530–1565 nm to a much broader wavelength range of around 1450–1650 nm. Some publications have discussed working at lower wavelength regions down to 1470 nm. In this regard, Electronics Letters, vol. 34, no. 11, pp. 1118–1119 (May 28, 1998) discusses an eight-channel WDM system operating from 1467 nm to 1478 nm, based on Thulium-doped fiber amplifiers. Others have addressed extending the operating bandwidth toward higher wavelength regions up to about 1600 nm. See, e.g., Srivastava et al. '1 Tb/s Transmission of 100 WDM 10 Gb/s Channels Over 400 km of TrueWave™ Fiber' PD10, OFC'98. See also M. Jinno et al. 'First demonstration of 1580 nm wavelength band WDM transmission for doubling usable bandwidth and suppressing FWM in DSF' Electronics Letters, vol. 33 no. 10 pp. 882–883 (May 8, 1997). This extended range of available operating wavelengths is due to a use of gain-shifted erbium-doped amplifiers.

In addition, the trend of expanding the amplification window is supported by the low attenuation of transmission fibers over the expanded transmission window between 1450 and 1650 nm. However, existing fibers are severely limited in their transmission capabilities outside of the traditional transmission window around 1550 nm. For example, currently available Non-Zero Negative Dispersion (NZD−) fibers have a zero-dispersion wavelength $\lambda_0$ at approximately 1585 nm and are therefore not suited for WDM transmissions because of non-linear effects at this operating wavelength. Similarly, Non-Zero Positive Dispersion (NZD+) and Large Effective Area (LEA) fibers have zero-dispersion wavelengths $\lambda_0$ in the area of 1500 nm and are therefore not suited for WDM transmissions at this operating wavelength. Thus, because of the associated non-linear effects, conventional fibers are not capable of supporting the newly broadened transmission window. Moreover, for NZD+ and LEA fibers, even if the transmission wavelengths were restricted to the band above 1530 nm, the dispersion at around 1600 nm and at higher wavelengths would be high, due to the steep slope of the dispersion curve, thus requiring dispersion compensation. Accordingly, Applicant has identified a need for an optical transmission fiber that is capable of supporting WDM transmissions across the transmission window from 1450 nm to 1650 nm that provides suitable dispersion characteristics, low attenuation, and resistance to non-linear effects.

Various patents and publications have discussed optical fibers for high performance communication systems. For example, U.S. Pat. No. 5,553,185 to Antos et al., discloses a NZD fiber that is characterized by a series of core regions each having a refractive-index profile and radius. The shape of the refractive-index profiles, in terms of the refractive-index difference and the radius, of each region may be adjusted to have properties tailored for a high performance telecommunication system. In particular, one of the regions has a depressed refractive-index difference. The dispersion slope of the disclosed fiber is less than 0.05 ps/nm²/km and the absolute value of the total dispersion is between 0.5 and 3.5 ps/nm/km over a pre-selected transmission range.

Another fiber for a high performance communication system is discussed in Y. Akasaka et al., Enlargement of Effective Core Area on Dispersion-Flattened Fiber and Its Low Non-Linearity, OFC '98 Technical Digest, pp. 302–304. This fiber is also characterized by a series of core regions having varying refractive-index differences and radii. One of the core regions also has a depressed refractive-index difference. The disclosed fiber has a low dispersion slope over the transmission window.

Lucent Technologies provided a press release in June 1998 introducing its TrueWave® RS Fiber that has a reduced slope of dispersion. According to the release, the new fiber has a dispersion slope across a wavelength band of about 1530–1620 nm with a low value, such that the dispersion ranges from about 3.5–7.5 ps/nm-km. The press release does not disclose the refractive index profile of the TrueWave® RS Fiber.

U.S. Pat. No. 4,852,968 discloses a single mode optical fiber whose refractive index profile comprises a depressed-index or trench region in the cladding region. By suitable adjustment of the position, width and index of the trench region, one or more fiber characteristics can be improved, relative to a similar fiber that does not comprise an index trench, such as: the slope of the chromatic dispersion curve at the zero dispersion wavelength; the spectral value over which the absolute value of the chromatic dispersion is less than a predetermined value; the maximum absolute value of the chromatic dispersion in a given spectral range; the bending loss at a given bend radius; the ratio $a_0/a_1$; the optical quality of the tube-derived material; the integrated mode power at $a_0$; the dopant concentration in the-core; and the dependence of $\lambda_0$ on the core radius.

U.S. Pat. No. 5,781,684 discloses a single mode optical waveguide having large effective area, achieved by using a segmented core profile which includes at least a segment, or a part of one segment, having a refractive index less than the minimum refractive index of the clad layer. Dispersion slope values above 0.085 ps/nm$^2$/km are disclosed.

U.S. Pat. No. 5,684,909 discloses a single mode optical waveguide having a core refractive index profile of at least four segments. The main features of the core design are: at least two non-adjacent core profile segments have positive $\Delta\%$; and at least two non-adjacent segments have negative $\Delta\%$. The waveguide structure lends itself to the manufacture of dispersion managed waveguide fibers.

Throughout the present description reference is made to refractive index profiles of optical fibers. The refractive index profiles comprise various radially arranged sections. Reference is made in the present description to precise geometrical shapes for these sections, such as step, alpha-profile, parabola. It is evident that the refractive index profiles achieved in practice may differ from the above, idealized, profiles. It has been shown in the literature, however, that these differences do not change the fiber characteristics if they are kept under control. See, for example, U.S. Pat. No. 4,406,518 (Hitachi).

In general, a refractive index profile has an associated effective refractive index profile which is different in shape. An effective refractive index profile may be substituted, for its associated refractive index profile without altering the waveguide performance. For example, see "Single Mode Fiber Optics", Luc B. Jeunhomme, Marcel Dekker Inc., 1990, page 32, section 1.3.2.

It will be understood that disclosing and claiming a particular refractive index profile shape, includes the associated equivalents, in the disclosure and claims.

SUMMARY OF THE INVENTION

Applicant has discovered that transmission fibers that operate over an extended operating range with suitable dispersion values but have a region within the fiber core with exclusively a depressed refractive index are subject to several disadvantages. In particular, these fibers have a high attenuation, which is due, in part, to the region of depressed refractive index. In addition, the disclosed profiles that have an annular core region of exclusively a depressed refractive index between a central raised-index region and a raised-index ring often result in diffusion of dopants between layers during the manufacturing process, which degrades the quality of the refractive-index profile. In general, an optical transmission fiber consistent with the present invention involves a single-mode optical transmission fiber for use in a wavelength division multiplexing system that has carrier wavelengths ranging from 1450 nm to 1650 nm. The fiber has a glass core that includes an inner core having a first refractive-index difference, a first layer radially surrounding the inner core along the length of the fiber and having a second refractive-index difference of less than zero, a second layer radially surrounding the first layer along the length of the fiber and having a third refractive-index difference of substantially zero, a third layer radially surrounding the second layer along the length of the fiber and having a fourth refractive-index difference of greater than zero, and a fourth layer radially surrounding the third layer along the length of the fiber and having a fifth refractive-index difference of less than zero. A glass cladding surrounds the glass core and has a refractive-index difference substantially equal to zero. In addition, the slope of the dispersion curve is less than about 0.07 ps/nm$^2$/km (and preferably less than about 0.05 ps/nm$^2$/km) over the range of carrier wavelengths.

In another aspect, a fiber consistent with the present invention involves a single-mode optical transmission fiber for use in a wavelength division multiplexing system that has carrier wavelengths ranging from 1450 nm to 1650 nm. The fiber has a glass core that includes an inner core having a first refractive-index difference, a first layer radially surrounding the inner core along the length of the fiber and having a second refractive-index difference of less than zero, a second layer radially surrounding the first layer along the length of the fiber and having a third refractive-index difference of substantially zero, a third layer radially surrounding the second layer along the length of the fiber and having a fourth refractive-index difference of greater than zero. A glass cladding surrounds the glass core and has a refractive-index difference substantially equal to zero. In addition, the slope of the dispersion curve is less than about 0.07 ps/nm$^2$/km (and preferably less than about 0.05 ps/nm$^2$/km) over the range of carrier wavelengths.

In another aspect, a fiber consistent with the present invention involves a single-mode optical transmission fiber for use in a wavelength division multiplexing transmission system having carrier wavelengths ranging between about 1530 nm and 1650 nm. The fiber of this embodiment has a zero-dispersion wavelength of about 1480 nm.

In another aspect, the invention includes a single-mode optical transmission fiber that has a glass core having a central cross-sectional area with a first refractive-index peak, an outside ring with a second refractive-index peak, a first intermediate region between the two peaks having a low-dopant content, and a second intermediate region between the first peak and the first intermediate region, with a refractive-index depression lower than the first intermediate region. The fiber may also have a layer radially surrounding the second refractive-index peak and having a depressed refractive-index difference. The fiber also has a glass cladding surrounding the glass core, wherein the fiber has a dispersion value of at least 1.5 ps/nm/km and a dispersion slope of less than about 0.07 ps/nm$^2$/km (and preferably less than about 0.05 ps/nm$^2$/km) over a wavelength range of about 1450–1650 nm.

In a further aspect the invention includes a method for producing a single-mode optical fiber for use in a wavelength-division-multiplexing transmission system having carrier wavelengths ranging between about 1450–1650 nm, comprising the steps of: producing a preform having an inner core region with a first refractive-index difference; a first layer radially surrounding the inner core region along the length of the preform and having a second refractive-index difference of less than zero, a second layer radially surrounding the first layer along the length of the preform and having a third refractive-index difference that, in absolute value, is less than 40% of said second refractive-index difference, a third layer radially surrounding the second layer along the length of the preform and having a fourth refractive-index difference of greater than zero; and a glass cladding layer surrounding the core region and having a refractive-index difference substantially equal to zero; and drawing said preform.

It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated and constitute a part of this specification, illustrate several embodiments of the invention, and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Optical fibers consistent with the present invention have a refractive-index profile that includes an area of depressed refractive-index difference adjacent an area having a refractive-index difference of substantially zero. Applicant has discovered that optical transmission fibers having refractive-index profiles of this nature can produce optical transmission characteristics in an operating wavelength range of between about 1450 nm and 1650 nm that include a moderate dispersion value at the lowest operating wavelength, a low dispersion slope, and a low attenuation.

Applicant has further discovered that optical transmission fibers including this refractive-index profile can effectively support Wavelength Division Multiplexing (WDM) and Hyper-Dense WDM optical transmissions over the operating wavelength transmission window between 1450 nm and 1650 nm.

Figure 5:
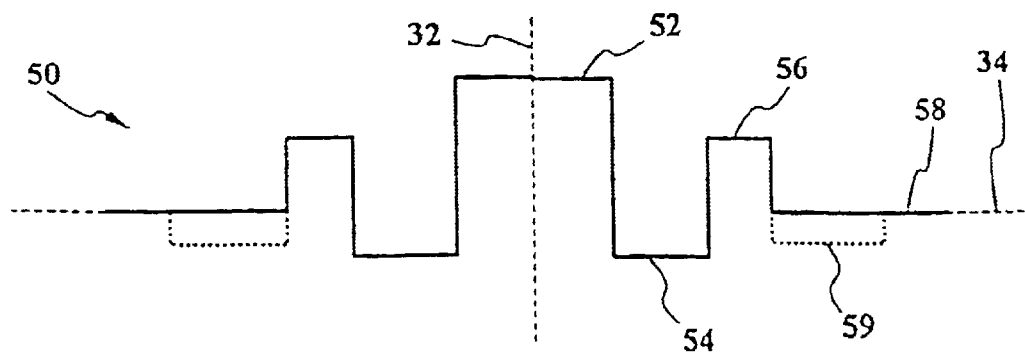
FIG. 5 is a graph illustrating the refractive-index profile of a conventional low dispersion slope fiber.

As shown in FIG. 5, conventional optical fibers that have an annular region of depressed refractive index include an inner core 52 having a first refractive-index difference $\Delta n_1$. A first glass layer 54 may surround inner core 52 as the annular region and have a depressed refractive index difference $\Delta n_2$. A second glass layer 56 may surround the first glass layer and have a peak refractive index difference $\Delta n_3$ within its width that is less than the peak refractive index within inner core 52 but greater than zero. A cladding layer 58 surrounds the second glass layer and has a refractive-index difference of substantially zero. In an alternative embodiment, an outer glass layer 59 with a negative refractive-index difference is arranged outside second glass layer 56, as shown by the dashed lines. Outer layer 59 may directly surround second glass layer 56.

The profile of FIG. 5 can be characterized by the volume of the depression that extends across annular layer 54. If r1 denotes the outer radius of the inner core 52 and r3 denotes the inner radius of second glass layer 56, then the fiber depressed profile volume is given by the following formula:

$$\int_{r_1}^{r_3} \Delta n \cdot r d r \qquad (1)$$

Applicant has found that optical transmission fibers having refractive-index profiles according to the present invention are better suited for use with WDM transmissions that range from about 1450 nm to 1650 nm than conventional fibers such as the fiber of FIG. 5. In particular, Applicant has discovered that by including in the cross-sectional outer part of the annular depression, a second glass layer having a refractive-index difference of substantially less, in absolute value, than the depressed refractive index difference, the depressed profile volume of the fiber according to Equation (1) above is reduced when compared to prior art fibers, while a desirably low dispersion slope can be achieved across the transmission window. The lower depressed profile volume results in lower amount of negative dopant and thus ease of manufacture of the fiber and lower attenuation. In addition, the fibers have a moderate value of dispersion at the lower end of the transmission window.

Figure 1:
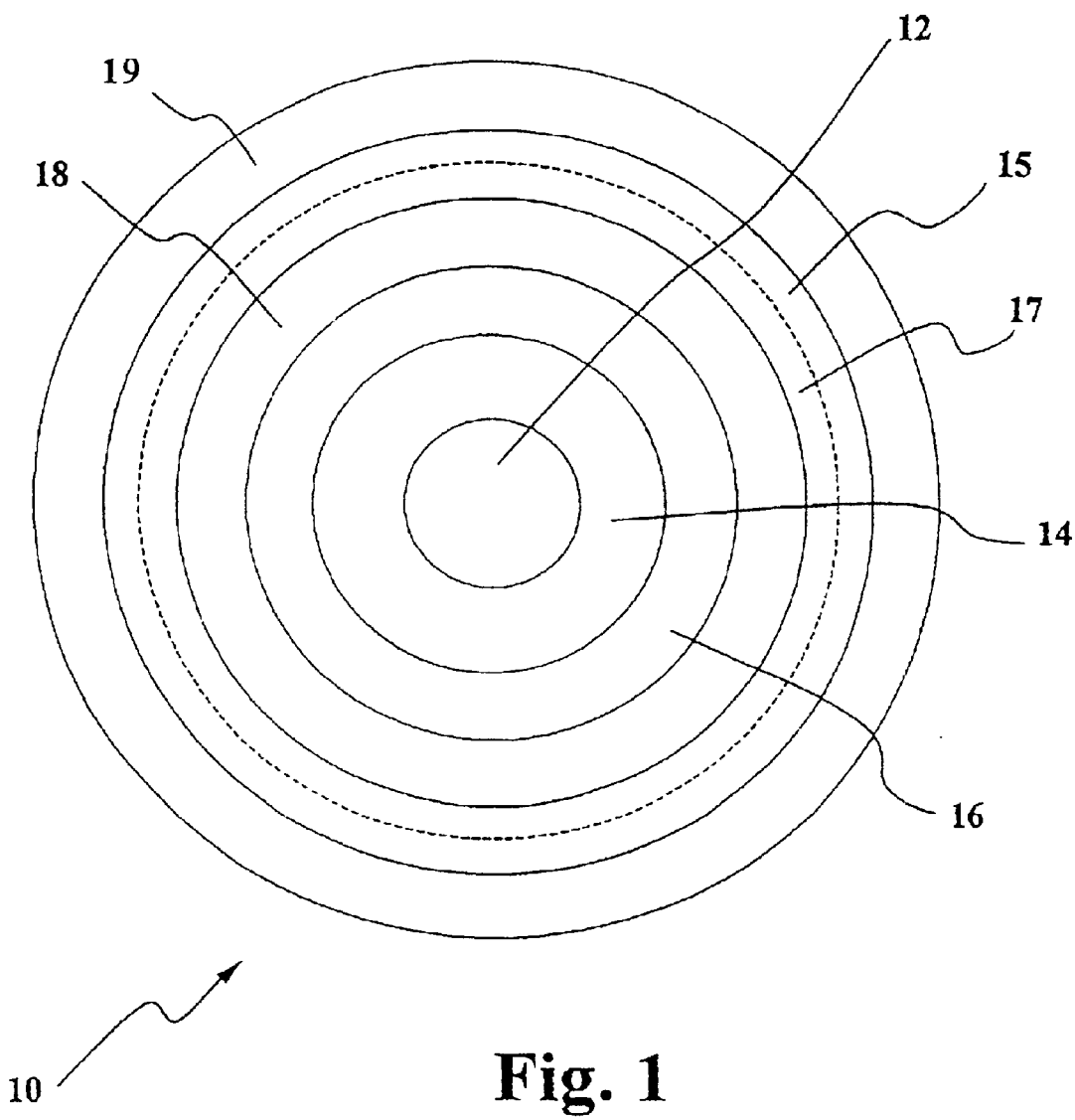
FIG. 1 is a cross section of an optical transmission fiber consistent with an embodiment of the present invention.

An optical fiber according to a preferred embodiment of the present invention is schematically illustrated in FIG. 1 and is generally designated by the reference number 10. In accordance with the present invention, an optical transmission fiber for use in a WDM transmission system includes a glass core with an inner core having a first refractive-index difference $\Delta n_1$, a first layer radially surrounding the inner core along the length of the fiber and having a second refractive-index difference $\Delta n_2$ of less than zero, a second layer radially surrounding the first layer along the length of the fiber and having a third refractive-index difference $\Delta n_3$ of substantially zero, a third layer radially surrounding the second layer along the length of the fiber and having a fourth refractive-index difference $\Delta n_4$ of greater than zero. A glass cladding surrounds the glass core and has a refractive-index difference substantially equal to zero. Preferably the core comprises a fourth layer radially surrounding the third layer along the length of the fiber and having a fifth refractive-index difference $\Delta n_5$ of less than zero.

The fiber has a dispersion value of at least 1.5 ps/nm/km over the carrier wavelength range (preferably over 2.5 ps/nm/km for dense WDM transmission) and a dispersion slope less than about 0.07 ps/nm$^2$/km (preferably less than about 0.05 ps/nm$^2$/km) over the carrier wavelength range.

As schematically illustrated in FIG. 1 (not-to-scale), optical fiber 10 includes a plurality of light conducting layers of glass. The axial center of fiber 10 is inner core 12, which is made of doped glass. Inner core 12 has a first refractive-index difference $\Delta n_1$ and a radius $r_1$. The refractive-index difference refers to the difference in refractive index between a given layer of glass and the cladding glass. That is, for example, the refractive-index difference $\Delta n_1$ of inner core 12 equals $n_1 - n_{cladding}$. $\Delta n_1$ can be chosen in the range 0.004–0.010, while $r_1$ can be chosen in the range 2–5 µm. Preferred ranges for $\Delta n_1$ and for $r_1$ are respectively 0.005–0.008 and 3–4 µm. Preferably, inner core 12 is made of SiO$_2$ doped with a substance that increases the refractive index of pure SiO$_2$ such as GeO$_2$.

A first glass layer 14 radially surrounds inner core 12 along the length of fiber 10. First glass layer 14 extends from the outer radius $r_1$ of the inner core to a radius $r_2$ and has a depressed index of refraction $\Delta n_2$ across its width. As is well known in the art, a depressed index of refraction exists when the index of refraction of a given glass layer is less than the refractive index of the cladding layer, i.e. $\Delta n_2$, as given by the above equation, is less than 0. As also known in the art, the dispersion slope of a fiber may, in general, be reduced by including a layer of glass having an area of depressed refractive index. $\Delta n_2$ can be chosen in the range −0.006–0.001, while a preferred range for $\Delta n_2$ is −0.003 to −0.002. Preferably, first glass layer 14 is made of SiO$_2$ doped with a substance that decreases the refractive index of pure SiO$_2$, such as fluorine. The width of first glass layer 14 can be chosen in the range 1–6 µm, a preferred range being 2–4 µm.

A second glass layer 16 radially surrounds first glass layer 14 along the length of fiber 10. Second glass layer 16 extends from the outer radius $r_2$ of the first glass layer to a radius $r_3$ and has an index of refraction $\Delta n_3$ within its width. The index of refraction $\Delta n_3$ of second glass layer 16 is, in absolute value, less than about 40% of $\Delta n_2$, preferably less than about 20% of $\Delta n_2$. Preferably, second glass layer is made of SiO$_2$, although the second glass layer may be made of any material or combination of materials having a refractive-index difference substantially equal to the refractive index of the cladding layer, described below. The width of second glass layer 16 can be chosen in the range 1–5 µm, a preferred range being 2–4 µm.

A third glass layer 18 radially surrounds second glass layer 16 along the length of fiber 10. Third glass layer extends from the outer radius $r_3$ of second glass layer 16 to an outer radius $r_4$. The third glass layer has a maximum refractive index $\Delta n_4$. $\Delta n_4$ can be chosen in the range 0.003–0.010, while a preferred range for $\Delta n_4$ is 0.004–0.008. The width of third glass layer 18 can be chosen in the range 1–4 µm, a preferred range being 2–3 µm.

A fourth glass layer 15 radially surrounds third glass layer 18 along the length of fiber 10. Fourth glass layer extends from the outer radius $r_4$ of third glass layer 18 to an outer radius $r_5$. The fourth glass layer has a refractive index difference $\Delta n_5$ that is less than zero. $\Delta n_5$ can be chosen in the range −0.003 to 0.0, while a preferred range for $\Delta n_5$ is −0.002 to 0.0. The width of fourth glass layer 15 can be chosen in the range 1–6 µm, a preferred range being 3–5 µm.

Finally, a light conducting cladding 19 surrounds the third glass layer 18 in a conventional manner to help guide light propagating along the axis of fiber 10. Cladding 19 may comprise pure SiO$_2$ glass with a refractive-index difference substantially equal to zero or include a refractive-index modifying dopant.

In an alternative embodiment, showed by dashed line, a fifth glass layer 17 having a refractive index difference $\Delta n_6$ that is substantially zero is comprised between third glass layer 18 and fourth glass layer 15.

Figure 2:
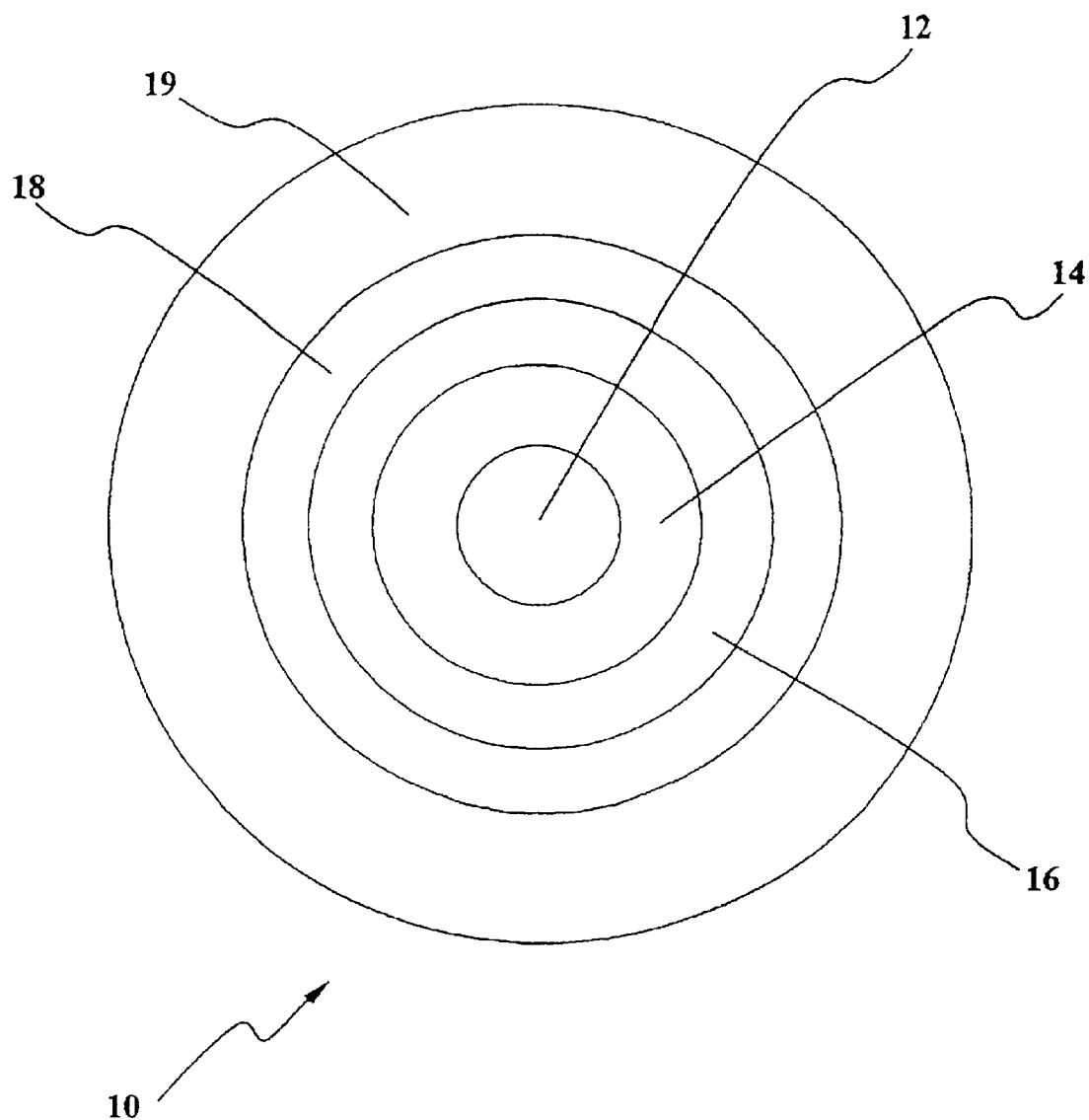
FIG. 2 is a cross section of an optical transmission fiber consistent with another embodiment of the present invention.

A particular embodiment, as shown in FIG. 2, derives from the embodiments of FIG. 1 when cladding 19 directly surrounds third glass layer 18, so that fourth and fifth glass layers are absent. However, the embodiments of FIG. 1, having an outer depressed glass layer 15 with or without a fifth glass layer 17, are preferred because they may simplify the achievement of single mode behavior at the operation wavelength.

Figure 3:
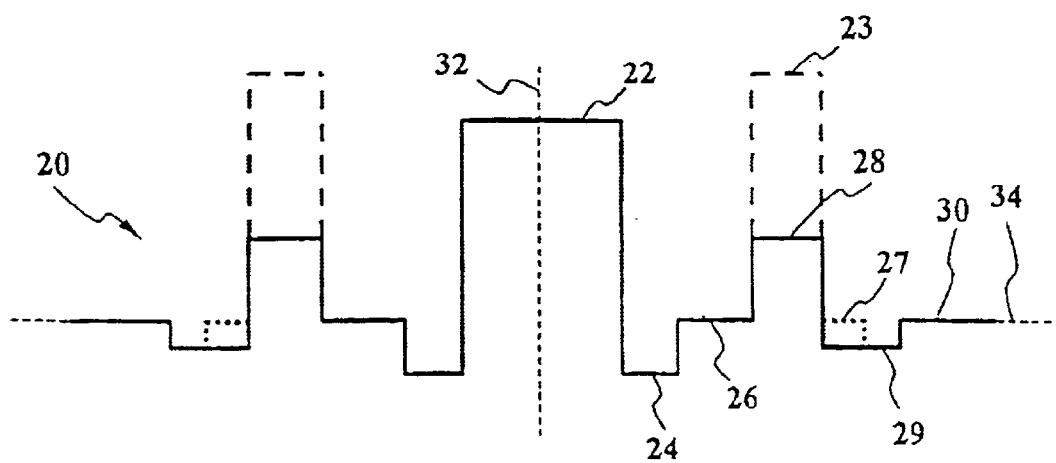
FIG. 3 is a graph illustrating an exemplary refractive-index profile of a fiber according to the present invention.

FIG. 3 illustrates a refractive-index profile 20 across the radius of fiber 10 for a first embodiment of the present invention, where axis 32 indicates the axial center of fiber 10 and axis 34 denotes a refractive-index difference of substantially zero. As shown, refractive-index profile has a first layer 24 having a depressed refractive index $\Delta n_2$ followed by a second layer 26 having a refractive-index difference of substantially zero. Layers 24 and 26 provide a depressed trench between inner core layer 22 and outer peak 28. In one preferred embodiment, the refractive-index difference $\Delta n_4$ of outer peak 28 is less than the refractive-index difference $\Delta n_1$ of inner core 22. In an alternative embodiment, as indicated by reference number 23, the refractive-index difference $\Delta n_4$ of outer peak 28 may be greater than the refractive-index difference $\Delta n_1$ of inner core 22. As shown, an outer layer 29 having a depressed refractive-index difference is placed outside outer peak 28. Outer layer 29 may surround outer peak 28 or, in an alternative embodiment, an intermediate layer 27 having a refractive-index difference of substantially zero may be arranged between outer peak 28 and outer layer 29.

Figure 4:
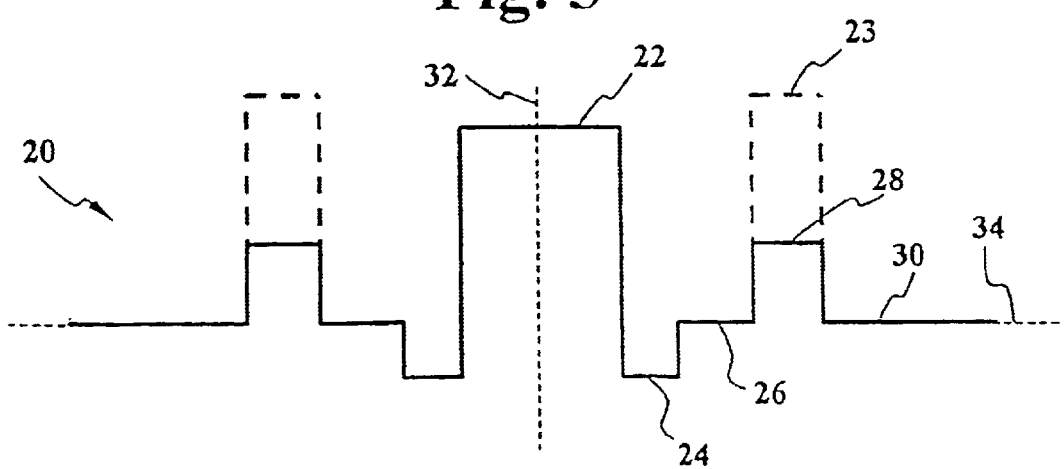
FIG. 4 is a graph illustrating another exemplary refractive-index profile of a fiber according to the present invention.

FIG. 4 shows another refractive-index-profile, corresponding to the embodiment of FIG. 2, wherein cladding 30 directly surrounds outer peak 28. The refractive-index profile of FIG. 4 differs from that of FIG. 3 in that outer layer 29 and intermediate layer 27 are absent.

Figure 6:
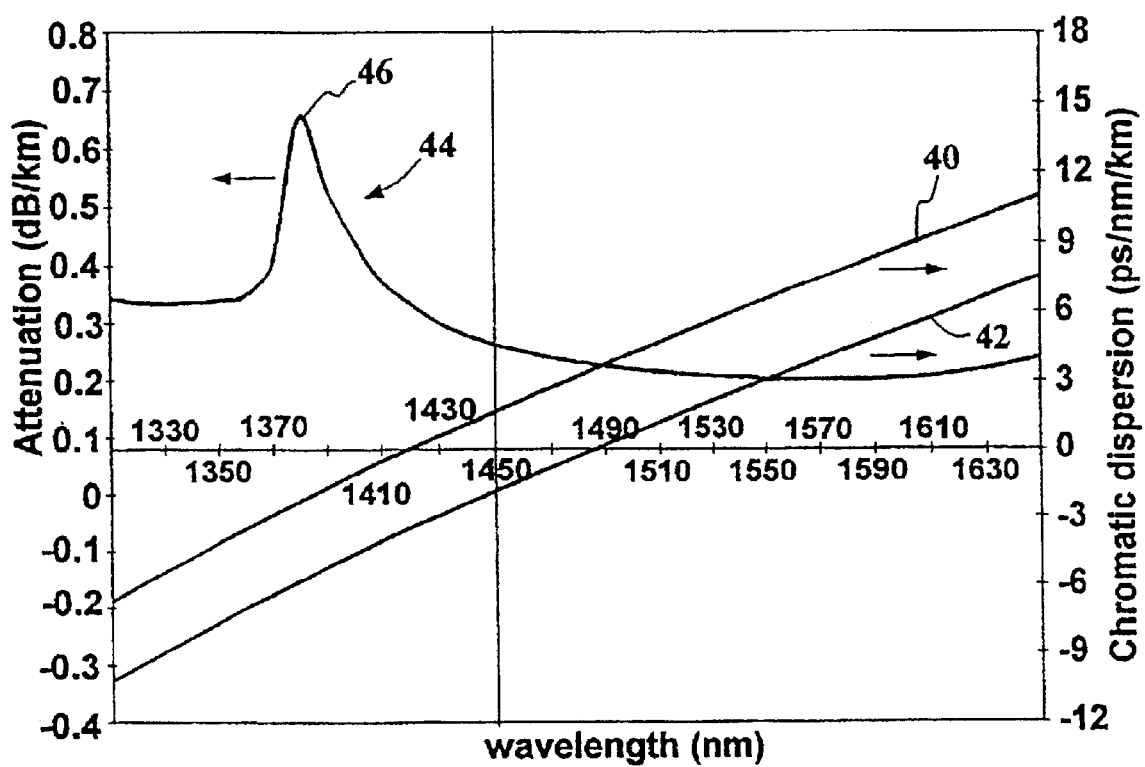
FIG. 6 is a graph illustrating the chromatic dispersion value as a function of transmission wavelength for two alternative embodiments of a fiber of the present invention and also illustrating the attenuation value as a function of transmission wavelength of a fiber according to the present invention.

FIG. 6 illustrates exemplary dispersion curves 40 and 42 and attenuation curve 44 a fiber 10 having a refractive-index profile according to the present invention. As shown in curve 44, the attenuation of fiber 10 reaches a peak 46 at a wavelength smaller than the transmission window of 1450–1650 nm. The attenuation of fiber 10 is less than about 0.27 dB/km over the transmission window from about 1450 nm to 1650 nm.

As also shown in 40, the dispersion at 1450 nm of a fiber 10 according to a first embodiment is about 1.5 ps/nm/km.

The slope of the dispersion curve is less than 0.06 ps/nm²/km across the bandwidth of 1450 nm to 1650 nm. Fiber 10 has a dispersion value less than about 12 ps/nm/km at 1650 nm. Curve 42 depicts a second embodiment of the present invention where the zero-dispersion wavelength occurs at around 1480 nm. A fiber 10 according to this second embodiment has a dispersion value of less than about 9 ps/nm/km at 1650 nm.

In addition, the effective area of fiber 10 at 1550 nm is greater than about 50 μm². As is readily known in the art, a large effective area will help limit the impact of non-linear effects. However, the dispersion slope of the fiber increases as the effective area of the fiber increases. The fiber of the present invention has an effective area that is large enough to limit the impact of non-linear effects while being small enough to achieve an optimal trade off between effective area and dispersion slope.

The transmission characteristics of a first embodiment of a fiber 10 having a refractive-index profile according to the present invention are provided in Table 1.

TABLE 1

Optical Transmission Characteristics

| | |
|---|---|
| Cable cut-off wavelength | <1400 nm |
| Effective Area | ≧50 μm² |
| Dispersion at 1450 nm | D ≧ 1.5 ps/nm/km (preferably ≧ 2.5 ps/nm/km) |
| Dispersion Slope @ 1550 nm | ≦0.070 ps/nm²/km (preferably ≦ 0.050 ps/nm²/km) |
| Attenuation @ 1310 nm | ≦0.45 dB/km |
| Attenuation @ 1550 nm | ≦0.30 dB/km |

Figure 7:
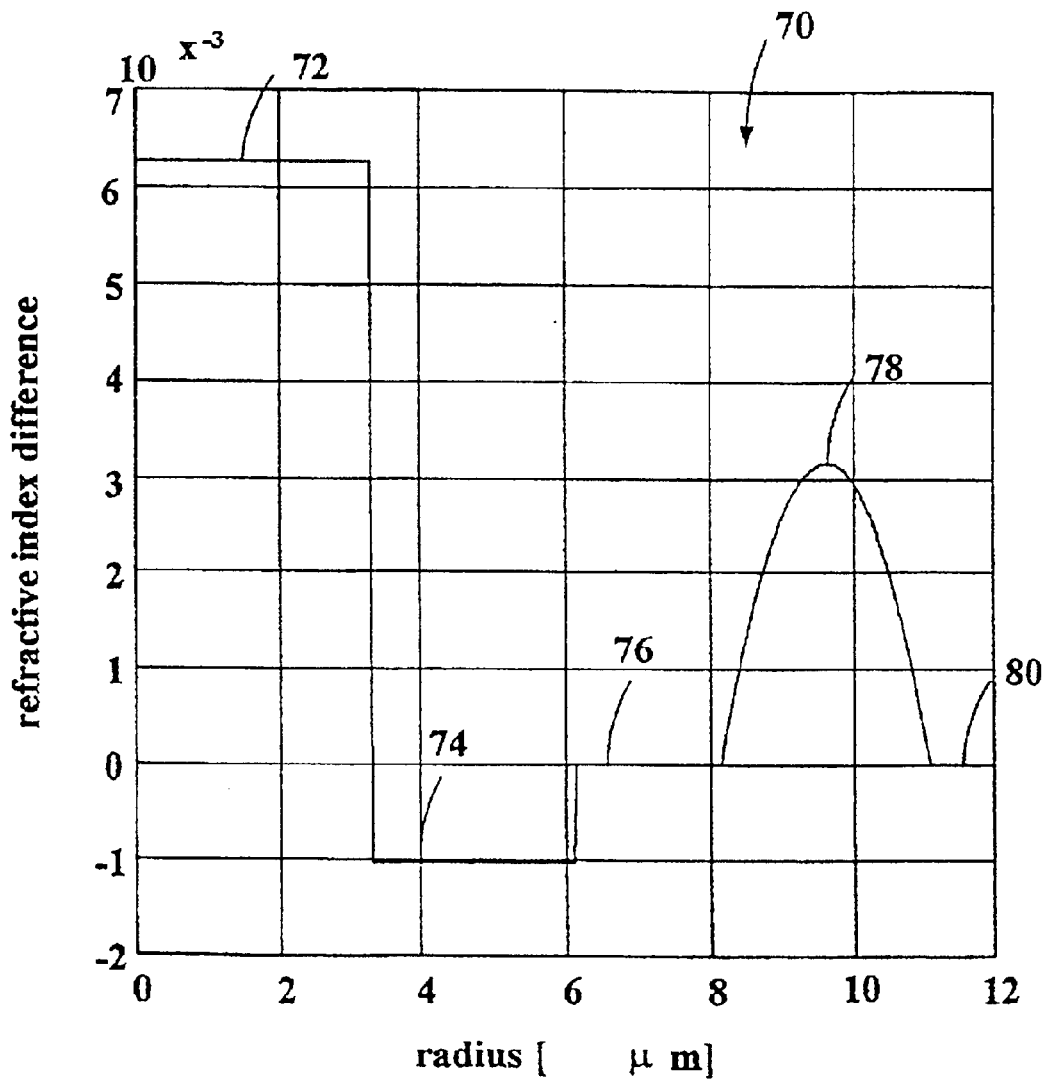
FIG. 7 is a graph illustrating a first example of a fiber according to the present invention.
Figure 8:
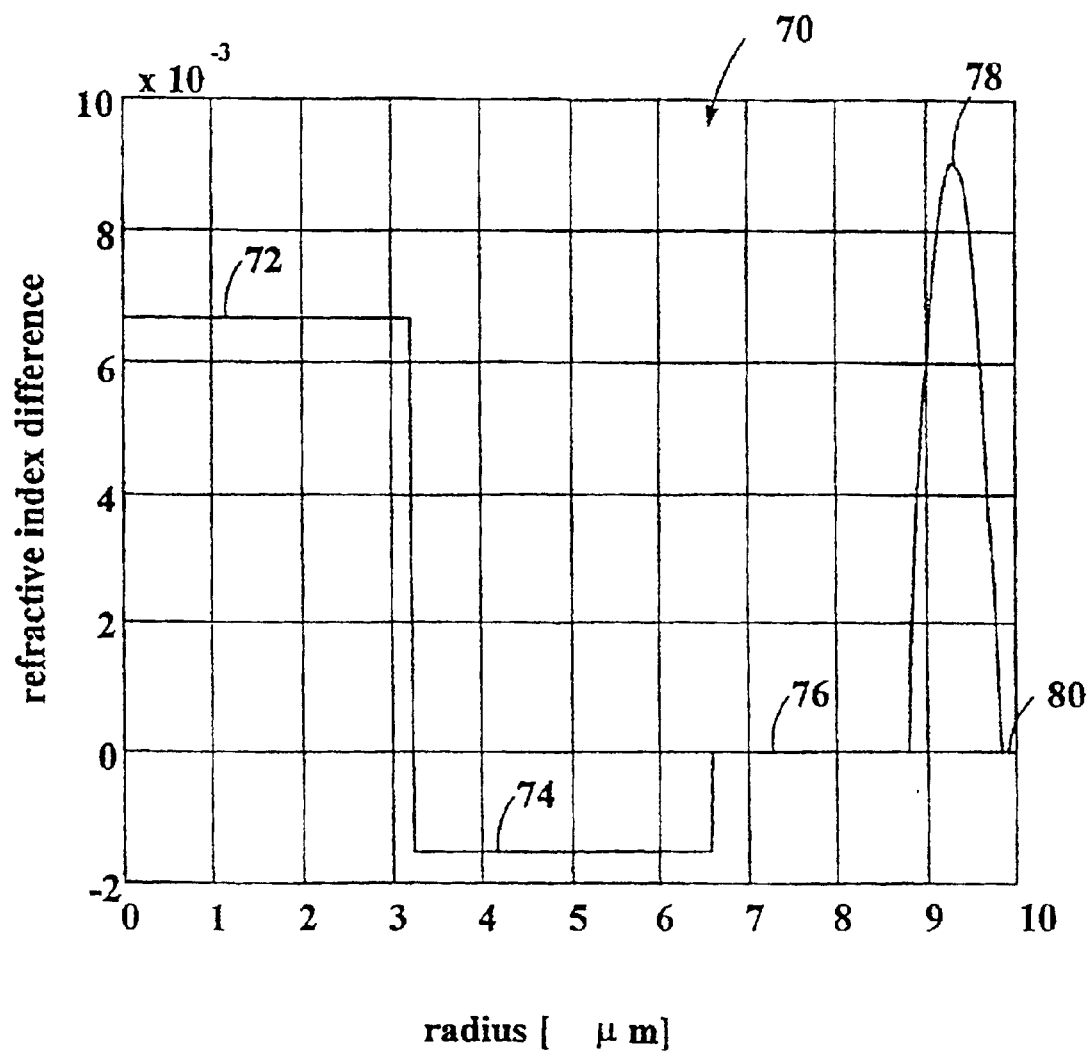
FIG. 8 is a graph illustrating a second example of a fiber according to the present invention.
Figure 9:
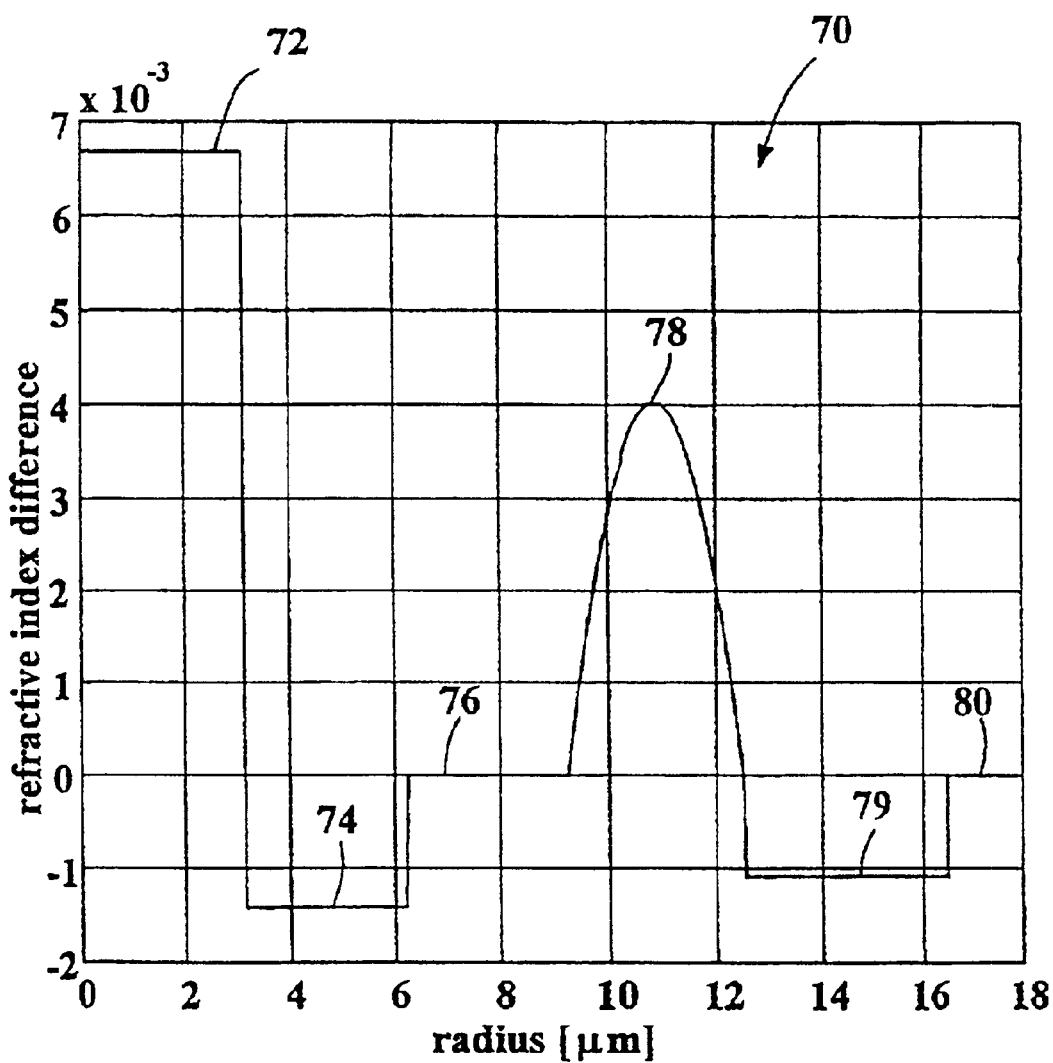
FIG. 9 is a graph illustrating a third example of a fiber according to the present invention.

FIGS. 7–9 illustrate specific examples of fibers having refractive-index profiles according to a first embodiment of the present invention.

EXAMPLE 1

As shown in FIG. 7, inner core 72 has a substantially constant refractive-index difference $\Delta n_1$ of about 0.0063 and extends for a radius $r_1$ of about 3.3 μm. The refractive-index difference of inner core 72 may be increased by doping the width of the inner core with $GeO_2$ or any other well-known refractive-index-increasing dopant. Although FIG. 7 depicts inner core 72 as having sharp edges, its profile may be rounded in actual implementation.

First glass layer 74 has a depressed refractive-index difference $\Delta n_2$ of about −0.0010 and extends for a radial distance of about 2.8 μm. Depressed profile volume is about −0.013 μm². The refractive-index difference of first glass layer 74 may be decreased by doping the width of the first core layer with fluorine or any other well-known refractive-index-decreasing dopant. Second glass layer 76 has a refractive-index difference $\Delta n_3$ of about 0 and extends for a radial distance of about 2.0 μm.

Third glass layer 78 has a substantially parabolic profile and reaches a maximum refractive index $\Delta n_4$ of about 0.0032 at a midpoint within its width of about 2.9 μm. The refractive-index difference of the third glass layer may be formed by doping the glass layer with increasing amounts of $GeO_2$, or other well-known refractive-index-increasing dopant.

Third glass layer 78 is surrounded by cladding 80 that has a refractive-index difference of about 0.

The specific embodiment of fiber 10 illustrated in FIG. 7 has the following optical transmission characteristics, which have been generated through computer simulations:

Cable cut off ≦1400 nm

Dispersion at 1450 nm=1.9 ps/nm/km

Dispersion Slope at 1450 nm=0.050 ps/nm²/km

Dispersion at 1550 nm=6.5 ps/nm/km

Dispersion Slope at 1550 nm=0.046 ps/nm²/km

Mode Field Diameter at 1550 nm=9.1 μm

Effective Area at 1550 nm=63 μm²

Non Linearity Coefficient γ=1.4 $W^{-1}$ $km^{-1}$

Macrobending attenuation <0.5 dB for 100 turns on a 60 mm diameter mandrel

Microbending sensitivity=2.9 (dB/km)/(g/mm) as determined by the expandable bobbin method, as described for example in G. Grasso and F. Meli "Microbending losses of cabled single-mode fibers", ECOC '88, page 526-ff., or in G. Grasso et al. "Microbending effects in single-mode optical cables", International Wire and Cable Symposium, 1988, page 722-ff.

EXAMPLE 2

In another embodiment and as shown in FIG. 8, inner core 72 has a substantially constant refractive-index difference $\Delta n_1$ of about 0.0067 and extends for a radius $r_1$ of about 3.2 μm. The refractive-index difference of inner core 72 may be increased by doping the width of the inner core with $GeO_2$ or any other well-known refractive-index-increasing dopant.

First glass layer 74 has a depressed refractive-index difference $\Delta n_2$ of about −0.0015 and extends for a radial distance of about 3.4 μm. Depressed profile volume is about −0.025 μm². The refractive-index difference of first glass layer 74 may be decreased by doping the width of the first core layer with fluorine or any other well-known refractive-index-decreasing dopant. Second glass layer 76 has a refractive-index difference $\Delta n_3$ of about 0 and extends for a radial distance of about 2.2 μm.

Third glass layer 78 has a substantially parabolic profile and reaches a maximum refractive index $\Delta n_4$ of about 0.0090 at a midpoint within its width of about 1.1 μm. The refractive-index difference of the third glass layer may be formed by doping the glass layer with increasing amounts of $GeO_2$, or any other well-known refractive-index-increasing dopant.

As can be seen, this embodiment of FIG. 8 has its outer peak 78 having refractive-index difference higher than inner peak 72. Third glass layer 78 is surrounded by cladding 80 that has a refractive-index difference of about 0.

The specific embodiment of fiber 10 illustrated in FIG. 8 has the following optical transmission characteristics.

Cable cut off ≦1400 nm

Dispersion at 1450 nm=1.6 ps/nm/km

Dispersion Slope at 1450 nm=0.042 ps/nm²/km

Dispersion at 1550 nm 5.0 ps/nm/km

Dispersion Slope at 1550 nm 0.036 ps/nm²/km

Mode Field Diameter at 1550 nm=8.6 μm

Effective Area at 1550 nm=57 μm²

Non Linearity Coefficient γ=1.6 $W^{-1}$ $km^{-1}$

Macrobending attenuation <0.5 dB for 100 turns on a 60 mm diameter mandrel

Microbending sensitivity=2.1 (dB/km)/(g/mm) as determined by the expandable bobbin method.

EXAMPLE 3

In another preferred embodiment and as shown in FIG. 9, inner core 72 of fiber 10 has a substantially constant refractive-index difference $\Delta n_1$ of about 0.0067 and extends for a radius $r_1$ of about 3.15 µm. The refractive-index difference of inner core 72 may be increased by doping the width of the inner core with $GeO_2$ or any other well-known refractive-index-increasing dopant.

First glass layer 74 has a depressed refractive-index difference $\Delta n_2$ of about −0.0014 and extends for a radial distance of about 3.1 µm. Depressed profile volume is about −0.021 1 µm². The refractive-index difference of first glass layer 74 may be decreased by doping the width of the first core layer with fluorine or any other well-known refractive-index-decreasing dopant. Second glass layer 76 has a refractive-index difference $\Delta n_3$ of about 0 and extends for a radial distance of about 3.0 µm Third glass layer 78 has a substantially parabolic profile and reaches a maximum refractive index $\Delta n_4$ of about 0.0040 at a midpoint within its width of about 3.2 µm. The refractive-index difference of the third glass layer may be formed by doping the glass layer with increasing amounts of $GeO_2$, or any other well-known refractive-index-increasing dopant.

Third glass layer 78 is surrounded by a fourth glass layer 79 that has a refractive-index difference of about −0.0011 along its width of 4.0 µm.

Fourth glass layer 79 is surrounded by cladding 80 that has a refractive-index difference of about 0.

The specific embodiment of fiber 10 illustrated in FIG. 9 has the following optical transmission characteristics.

Cable cut off ≦1400 nm

Dispersion at 1450 nm=1.6 ps/nm/km

Dispersion Slope at 1450 nm=0.038 ps/nm²/km

Dispersion at 1550 nm=5.1 ps/nm/km

Dispersion Slope at 1550 nm=0.034 ps/nm²/km

Mode Field Diameter at 1550 nm=8.6 µm

Effective Area at 1550 nm=56 µm²

Non Linearity Coefficient γ=1.6 $W^{-1}$ $km^{-1}$

Macrobending attenuation <0.5 dB for 100 turns on a 60 mm diameter mandrel

Microbending sensitivity=2.0 (dB/km)/(g/mm) as determined by the expandable bobbin method.

In accordance with the present invention, the optical transmission fiber having a refractive-index profile as described herein may be used with a WDM transmission system that operates at larger wavelengths. In particular, a second embodiment of the invention fiber may be used with WDM transmission systems that have carrier wavelengths in the range of about 1530 nm to 1650 nm. FIG. 4 illustrates a dispersion curve 42 for a fiber according to this second embodiment.

As shown in FIG. 4, the zero-dispersion wavelength of fiber 10 is shifted to around 1480 nm. The dispersion slope of dispersion curve 42 is preferably less than about 0.06 ps/nm²/km. The resulting dispersion value over the larger wavelengths is thereby reduced. Preferably, fiber 10 has a dispersion less than about 9 ps/nm/km at the larger transmission wavelength of 1650 nm. The optical transmission characteristics of the fiber of this second embodiment are presented in Table 2.

TABLE 2

| Optical Transmission Characteristics | |
|---|---|
| Cable cut-off wavelength ($\lambda_{cc}$) | <1500 nm |
| Effective Area | ≧50 µm² |
| Dispersion at 1530 nm | D ≧ 1.5 ps/nm/km (preferably ≧ 2.5 ps/nm/km) |
| Dispersion Slope @ 1550 nm | ≦0.070 ps/nm²/km (preferably ≦ 0.050 ps/nm²/km) |
| Attenuation @ 1310 nm | ≦0.45 dB/km |
| Attenuation @ 1550 nm | ≦0.30 dB/km |

Figure 10:
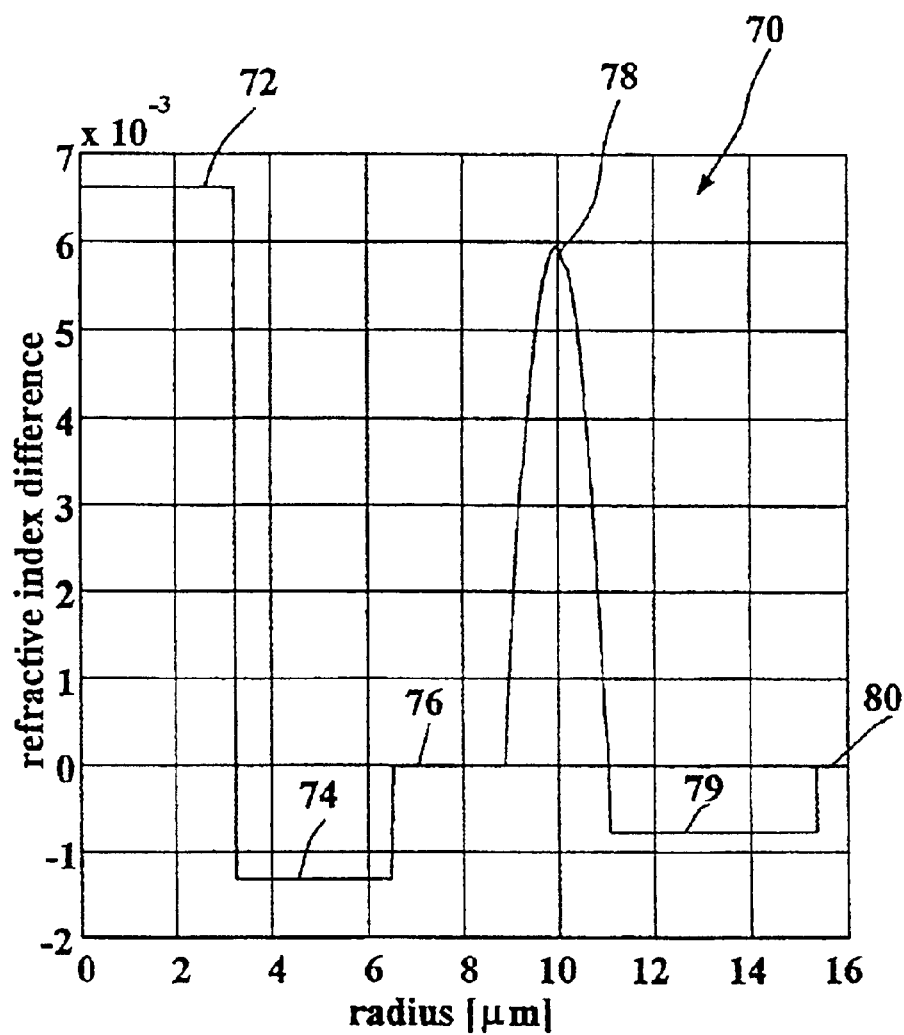
FIG. 10 is a graph illustrating a fourth example of a fiber according to the present invention.
Figure 11:
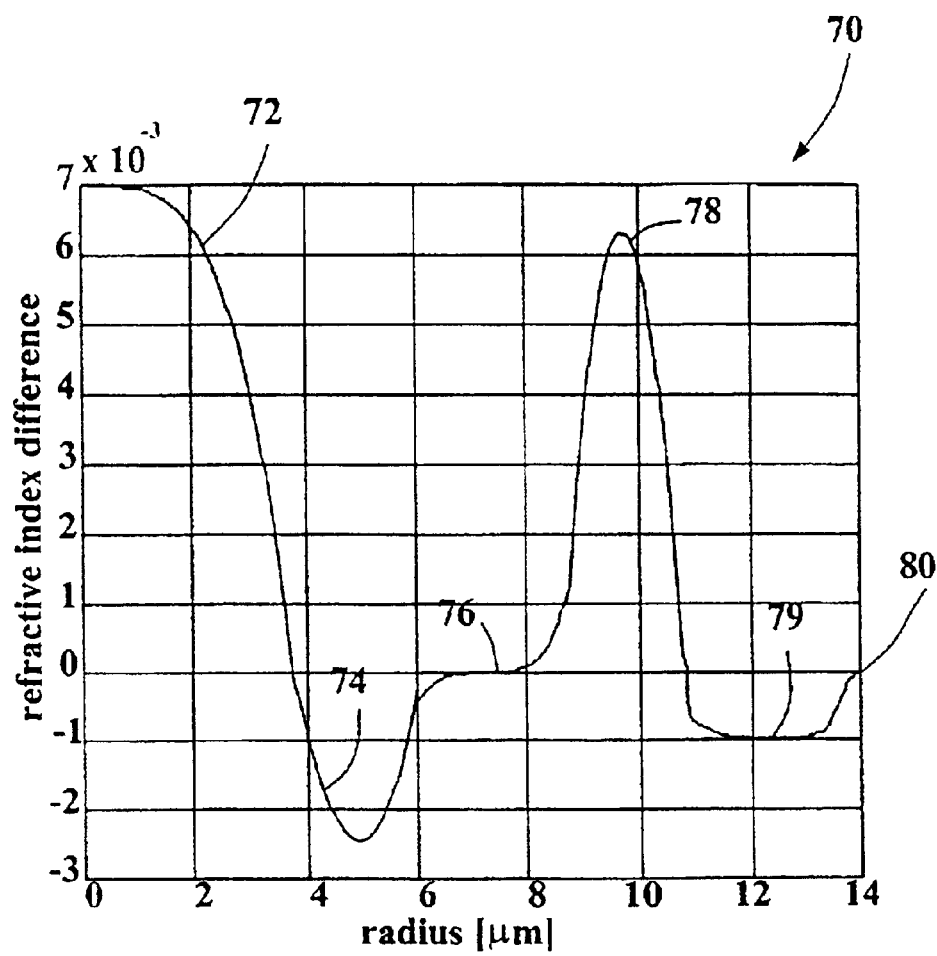
FIG. 11 is a graph illustrating a fifth example of a fiber according to the present invention.

FIGS. 10–11 illustrate specific examples of fibers having refractive-index profiles according to a second embodiment of the present invention.

EXAMPLE 4

FIG. 10 illustrates a refractive-index profile of a fiber according to this second embodiment. Inner core 72 of fiber 10 has a substantially constant refractive-index difference $\Delta n_1$ of about 0.0066 and extends for a radius $r_1$ of about 3.2 µm. The refractive-index difference of inner core 72 may be increased by doping the width of the inner core with $GeO_2$ or any other well-known refractive-index-increasing dopant.

First glass layer 74 has a depressed refractive-index difference $\Delta n_2$ of about −0.0013 and extends for a radial distance of about 3.3 µm. Depressed profile volume is about −0.021 µm². The refractive-index difference of first glass layer 74 may be decreased by doping the width of the first core layer with fluorine or any other well-known refractive-index-decreasing dopant. Second glass layer 76 has a refractive-index difference $\Delta n_3$ of about 0 and extends for a radial distance of about 2.4 µm.

Third glass layer 78 has a substantially parabolic profile and reaches a maximum refractive index $\Delta n_4$ of about 0.0058 at a midpoint within its width of about 2.1 µm. The refractive-index difference of the third glass layer may be formed by doping the glass layer with increasing amounts of GeO2, or any other well-known refractive-index-increasing dopant.

Third glass layer 78 is surrounded by a fourth glass layer 79 that has a refractive-index difference of about −0.0008 along the width of 4.3 µm.

Fourth glass layer 79 is surrounded by cladding 80 that has a refractive-index difference of about 0.

The specific embodiment of fiber 10 illustrated in FIG. 10 has the following optical transmission characteristics.

Cable cut off ≦1500 nm

Dispersion at 1550 nm=3.3 ps/nm/km

Dispersion Slope at 1550 nm=0.038 ps/nm²/km

Mode Field Diameter at 1550 nm=8.7 µm

Effective Area at 1550 nm=59 µm²

Non Linearity Coefficient γ=1.5 $W^{-1}$ $km^{-1}$

Macrobending attenuation <0.5 dB for 100 turns on a 60 mm diameter mandrel

Microbending sensitivity=3.0 (dB/km)/(g/mm) as determined by the expandable bobbin method.

EXAMPLE 5

FIG. 11 illustrates another refractive-index profile of a fiber according to the second embodiment. Inner core 72 of fiber 10 has an α-profile shape with a α=4 and a maximum refractive-index difference $\Delta n_1$ of about 0.0070. Inner core 72 extends for a radius $r_1$ of about 3.7 µm. The refractive-index difference of inner core 72 may be increased by doping the width of the inner core with $GeO_2$ or any other well-known refractive-index-increasing dopant.

First glass layer 74 has a substantially parabolic depressed profile and reaches a minimum refractive-index difference $\Delta n_2$ of about −0.0024 at a midpoint within its width of about 2.4 µm. The refractive-index difference of first glass layer 74 may be decreased by doping the width of the first core layer with fluorine or any other well-known refractive-index-decreasing dopant. Second glass layer 76 has a refractive-index difference $\Delta n_3$ of about 0 and extends for a radial distance of about 2.6 µm.

Third glass layer 78 has a substantially parabolic profile and reaches a maximum refractive index $\Delta n_4$ of about 0.0063 at a midpoint within its width of about 2.1 µm. The refractive-index difference of the third glass layer may be formed by doping the glass layer with increasing amounts of $GeO_2$, or any other well-known refractive-index-increasing dopant.

Third glass layer 78 is surrounded by a depressed fourth glass layer 79 that has a minimum refractive-index difference of about −0.001 across its width of 2.9 µm.

Fourth glass layer 79 is surrounded by cladding 80 that has a refractive-index difference of about 0.

The specific embodiment of fiber 10 illustrated in FIG. 11 has the following optical transmission characteristics.

Cable cut off ≦1500 nm

Dispersion at 1550 nm=3.5 ps/nm/km

Dispersion Slope at 1550 nm=0.043 ps/nm²/km

Mode Field Diameter at 1550 nm=8.9 µm

Effective Area at 1550 nm=61 µm²

Non Linearity Coefficient γ=1.4 $W^{-1}$ $km^{-1}$

Macrobending attenuation <0.5 dB for 100 turns on a 60 mm diameter mandrel

Microbending sensitivity=3.9 (dB/km)/(g/mm) as determined by the expandable bobbin method.

Figure 12:
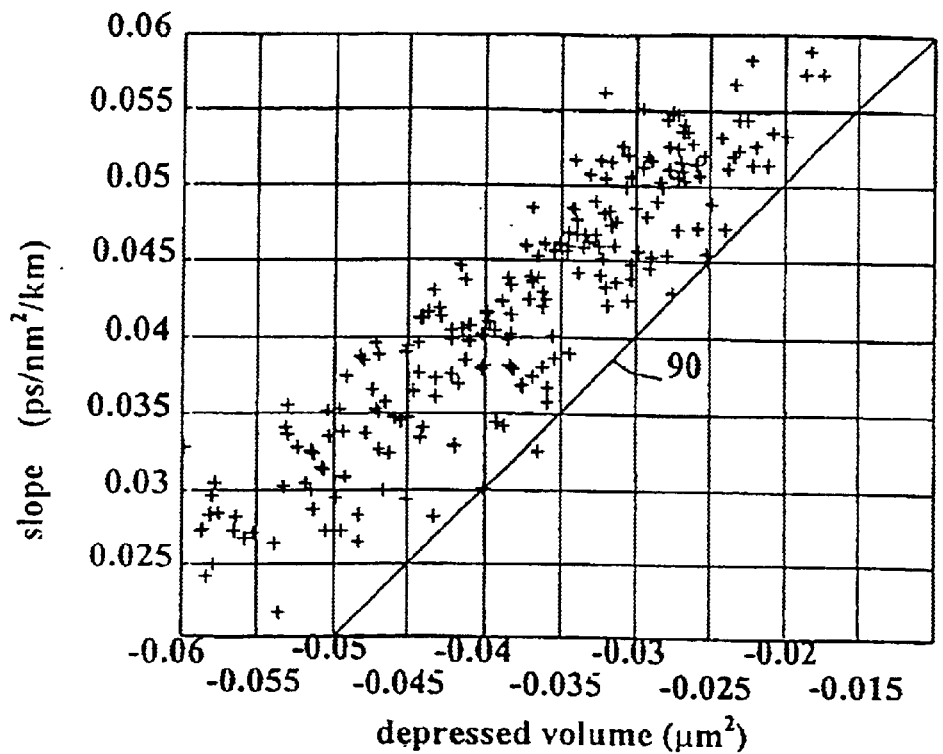
FIG. 12 is a graph illustrating the relation between dispersion slope and depressed profile volume and for a set of fibers having refractive index profiles according to the conventional design of FIG. 5.

FIG. 12 shows the relation between dispersion slope and depressed profile volume for a set of fibers with refractive index profiles according to the conventional design of FIG. 5. Random sets of parameter values defining refractive-index profiles according to FIG. 5 have been chosen. The optical transmission characteristics of each set have been evaluated by computer simulation.

Each cross in FIG. 12 represents a set of parameter values corresponding to a refractive index profile achieving optical transmission characteristics in the following ranges:

| Theoretical cut-off | <1800 nm |
| Dispersion at 1550 nm | 2–8 ps/nm/km |
| Effective area | 53–57 µm² |

Macrobending attenuation <0.5 dB for 100 turns on 60 mm diameter mandrel

Microbending sensitivity <5 (dB/km)/(g/mm) by the expandable bobbin test method, while parameter sets giving refractive-index profiles having optical transmission characteristics outside the above ranges have not been represented on FIG. 12.

Figure 13:
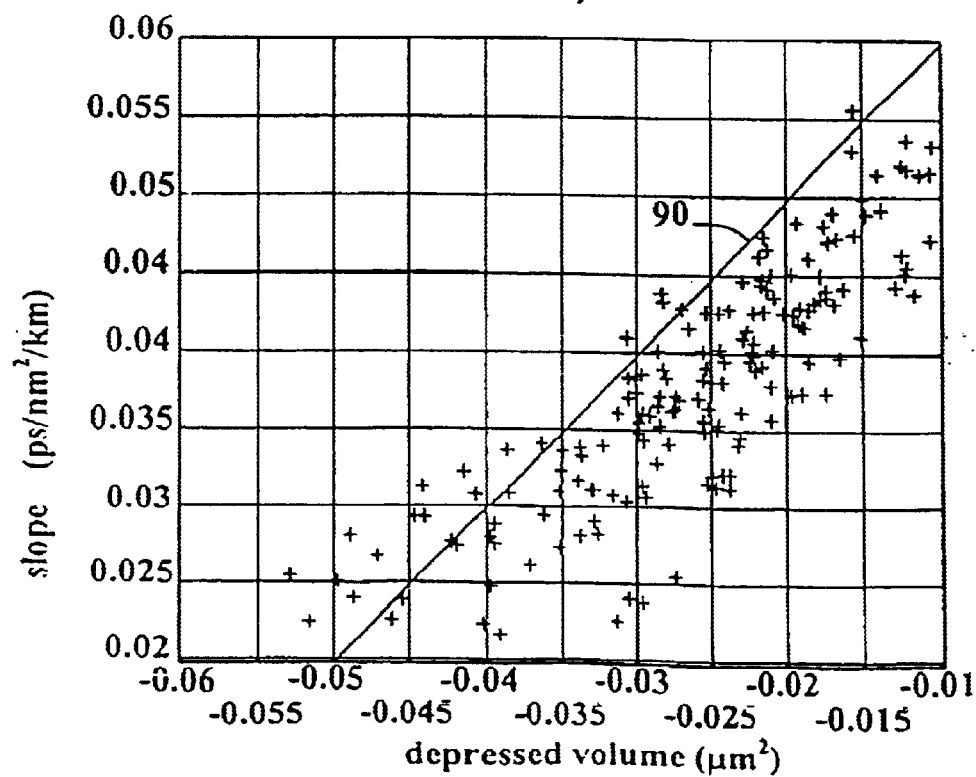
FIG. 13 is a graph illustrating the relation between dispersion slope and depressed profile volume and for a set of fibers having refractive index profiles according to the invention.

A comparative example for a set of invention refractive-index profiles according to FIG. 4 is shown in FIG. 13. The selection criteria are the same as above.

On both graphs a line 90 has been drawn corresponding to the relationship $$S=0.07+V \quad (2)$$

between the dispersion slope S (in units of ps/nm²/km) and the depressed profile volume V (in units of µm²).

As it is shown by above exemplary embodiments, there is a trade off between low dispersion slope and depressed profile volume. For corresponding fiber performances, the lower the dispersion slope, the higher the depressed profile volume, thus increasing manufacturing complexity and dopant content.

The above graphs in FIGS. 12 and 13 show, however, that refractive index profiles corresponding to the conventional design of FIG. 5 tend to have dispersion slope values greater than those given by (2), while refractive index profiles according to the present invention have dispersion slope values that are concentrated below those given by (2).

Figure 14:
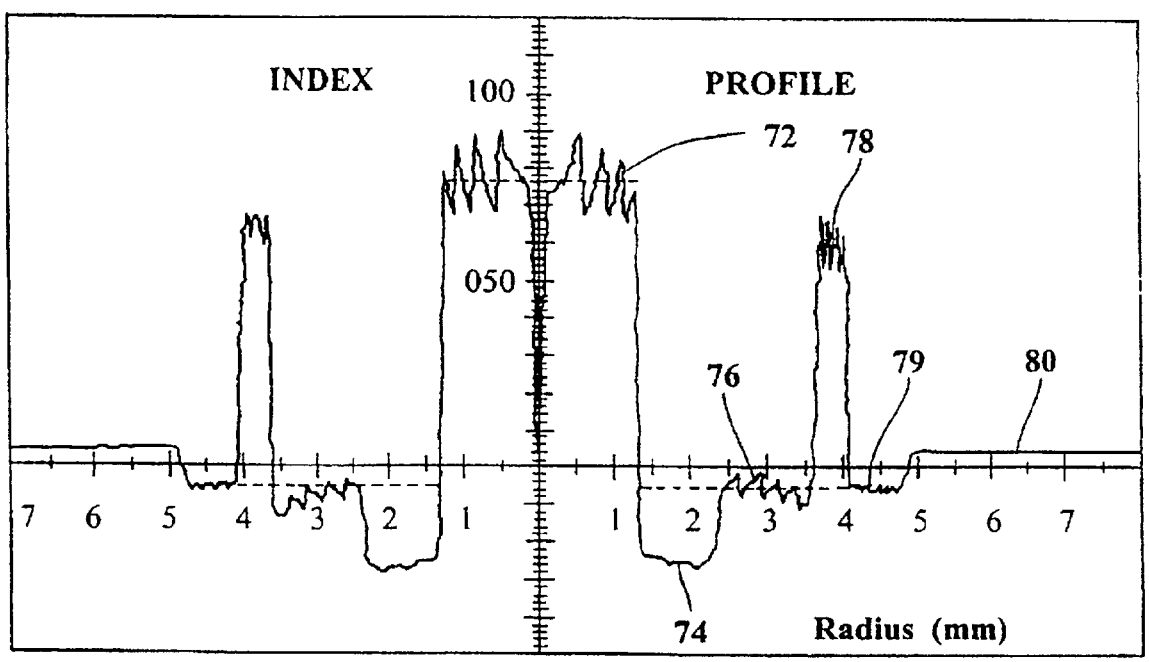
FIG. 14 is a refractive index profile of a fiber preform produced by Applicant by the MCVD method.

A refractive index profile of a fiber preform made by Applicant with the MCVD technique is shown in FIG. 14. The preform comprises inner core region 72, first glass layer 74, second glass layer 76, third glass layer 78, depressed fourth glass layer 79 and cladding 80.

The preform layers correspond to those of the invention fiber according to the embodiment described with reference to FIG. 3.

During the drawing process, in particular due to dopant diffusion, the refractive-index profile for the drawn fiber may in general undergo some changes from the preform refractive-index profile. In particular, second glass layer 76 is doped so as to achieve a refractive index difference value that is more negative than the desired refractive index value of the drawn fiber, to account for a corresponding small increase in the refractive index of this layer during the drawing process. The amount of this increase can be determined by the skilled in the art, based on the preform characteristics and on the fiber drawing process parameters.

Applicant has determined that a preform having a refractive-index profile corresponding to that described in general with reference to FIG. 3, wherein in particular a second glass layer 76 has a refractive index difference that, in absolute value, is less than 40% of the refractive-index difference of a first glass layer 74, can be drawn by a conventional drawing process to give an optical fiber having desirable optical transmission characteristics over the wavelength range 1450–1650 nm, and having in particular an attenuation of about 0.21 dB/km at 1550 nm, low macrobending and microbending losses and an improved relationship between dispersion slope and depressed profile volume.

Although the MCVD technique has been used to produce the preform shown in FIG. 14, other available vapor deposition techniques can be selected by the skilled in the art to the same end.

It will be apparent to one skilled in the art that various modifications and variations may be made to the fiber of the present invention without departing from the scope of the invention. For example, the refractive-index profiles depicted in the figures are intended to be exemplary of preferred embodiments. The precise shape, radial distance, and refractive-index differences may readily be fluctuated by one of ordinary skill in the art to obtain equivalent fibers to those disclosed herein without departing from the scope of this invention. The present invention covers the modifications and variations of this invention provided they come within the scope of the appended claims and their equivalents.

What is claimed is:

1. A single-mode optical transmission fiber for use in a wavelength-division-multiplexing system having carrier wavelengths in an extended wavelength range between about 1530 and 1650 nm, the fiber comprising:
 a glass core including:
  an inner core having a first refractive-index difference;
  a first layer radially surrounding the inner core along the length of the fiber and having a second refractive-index difference of less than zero;
  a second layer radially surrounding the first layer along the length of the fiber and having a third refractive-index difference;
  a third layer radially surrounding and adjacent to the second layer along the length of the fiber and having a fourth refractive-index difference of greater than zero;
 a glass cladding surrounding the glass core and having a refractive-index difference substantially equal to zero, wherein said second layer has a width in the range 1–5 μm and said third refractive-index difference is, in absolute value, less than 40% of said second refractive-index difference.

2. The fiber of claim 1, wherein said third refractive-index difference is, in absolute value, less than 20% of said second refractive-index difference.

3. The fiber of claim 2, wherein said third refractive-index difference is substantially zero.

4. The fiber according to claim 1, wherein said second layer has a width in the range of 2–4 μm.

5. The fiber according to claim 1, further comprising a fourth layer radially surrounding the third layer along the length of the fiber and having a fifth refractive-index difference of less than zero.

6. The fiber according to claim 1, wherein the first refractive-index difference of the inner core exceeds the fourth refractive-index difference of the third layer.

7. The fiber according to claim 1, wherein the fourth refractive-index difference of the third layer exceeds the first refractive-index difference of the inner core.

8. The fiber according to claim 1, wherein the fiber has a zero-dispersion wavelength of less than about 1500 nm.

9. The fiber claim 8, wherein the fiber has a zero-dispersion wavelength of less than about 1480 nm.

10. The fiber according to claim 1, wherein the fiber has a dispersion slope less than or equal to 0.043 ps/nm²/km at a wavelength of 1550 nm.

11. The fiber according to claim 1, wherein the extended wavelength range is between about 1450 and 1650 nm.

12. The fiber of claim 11, wherein the fiber has a dispersion slope less than about 0.07 ps/nm²/km over the extended wavelength range.

13. The fiber of claim 12, wherein the fiber has a dispersion slope less than about 0.05 ps/nm²/km over the extended wavelength range.

14. The fiber according to claim 1, wherein the fiber has a dispersion value of at least 1.5 ps/nm/km over the extended wavelength range.

15. The fiber of claim 14, wherein the dispersion value ranges from about 1.5–12 ps/nm/km across the extended wavelength range.

16. The fiber according to claim 1, wherein the fiber has a dispersion slope less than or equal to 0.046 ps/nm²/km at a wavelength of 1550 nm.

17. The fiber according to claim 1, wherein the fiber has a zero-dispersion wavelength of less than about 1450 nm.

18. The fiber according to claim 1, wherein the fiber has an effective area of greater than 50 μm².

19. The fiber according to claim 18, wherein the fiber has an effective area of about 55 μm².

20. A method for producing a single-mode optical fiber for use in a wavelength-division-multiplexing transmission system having carrier wavelengths in an extended wavelength range, comprising:
 producing a preform having
  an inner core region with a first refractive-index difference;
  a first layer radially surrounding the inner core region along the length of the preform and having a second refractive-index difference of less than zero;
  a second layer radially surrounding the first layer along the length of the preform and having a third refractive-index difference;
  a third layer radially surrounding and adjacent to the second layer along the length of the preform and having a fourth refractive-index difference of greater than zero; and
  a glass cladding surrounding the core region and having a refractive-index difference substantially equal to zero; and
 drawing said preform,
 wherein the step of producing a preform comprises:
  selecting said third refractive-index difference to be, in absolute value, less than 40% of said second refractive-index difference; and
  selecting a width of said second layer in the preform so that a corresponding layer in the drawn fiber has a width in the range of 1–5 μm.

21. The method of claim 20, wherein said third refractive-index difference is selected to be, in absolute value, less than 20% of said second refractive-index difference.

22. The method according to claim 20, wherein the step of producing a preform comprises selecting a width of said second layer in the preform so that a corresponding layer in the drawn fiber has a width in the range of 2–4 μm.

23. The method according to claim 20, comprising selecting the widths of said inner core region and of said first, second and third layers and selecting said first, second, third and fourth refractive index differences so that the dispersion slope of the drawn fiber is less than or equal to 0.046 ps/nm²/km at a wavelength of 1550 nm.

24. The method of claim 23, comprising selecting the widths of said inner core region and of said first, second and third layers and selecting said first, second, third and fourth refractive-index differences so that the dispersion slope of the drawn fiber is less than or equal to 0.043 ps/nm²/km at a wavelength of 1550 nm.

25. A single-mode optical transmission fiber, comprising:
 a glass core having a central cross-sectional area with a first refractive-index peak, an outside ring with a second refractive-index peak higher than the first peak, a first intermediate region between the two peaks having a low-dopant content, and a second intermediate region between the first peak and the first intermediate region with a refractive-index depression lower than the first intermediate region; and
 a glass cladding surrounding the glass core, wherein the fiber has a dispersion slope of less than about 0.05 ps/nm²/km over a wavelength range of about 1530–1650 nm.

26. The fiber of claim 25, further comprising a layer radially surrounding the outside ring and having a depressed refractive-index difference.

27. The fiber according to claim 25, wherein the fiber has a dispersion value of at least 1.5 ps/nm/km over a wavelength range of about 1530–1650 nm.

28. The fiber of claim 27, wherein the fiber has a zero-dispersion wavelength of less than 1500 nm.

29. The fiber of claim 28, wherein the fiber has a zero-dispersion wavelength of less than about 1480 nm.

30. The fiber according to claim 25, wherein the fiber has a dispersion slope of less than about 0.05 ps/nm$^2$/km over a wavelength range of about 1450–1650 nm.

31. The fiber of claim 30, wherein the fiber has a zero-dispersion wavelength of less than about 1450 nm.

32. The fiber according to claim 25, wherein the fiber has an effective area of greater than 50 $\mu$m$^2$.

33. The fiber according to claim 32, wherein the fiber has an effective area of about 55 $\mu$m$^2$.

* * * * *